United States Patent [19]

Sekigawa

[11] 4,355,337

[45] Oct. 19, 1982

[54] METHOD OF RESTORING PICTURES WITH HIGH DENSITY

[75] Inventor: Keiji Sekigawa, Yokohama, Japan

[73] Assignee: Ricoh Co., Ltd., Tokyo, Japan

[21] Appl. No.: 123,484

[22] Filed: Feb. 21, 1980

[30] Foreign Application Priority Data

Feb. 22, 1979 [JP] Japan .................................. 54-19989

[51] Int. Cl.³ ............................................. H04N 7/12
[52] U.S. Cl. .................................... 358/284; 358/260
[58] Field of Search ............... 358/260, 263, 133, 284; 340/146.3 MA, 146.3 H

[56] References Cited

U.S. PATENT DOCUMENTS 3,462,547 8/1969 Macovski .............................. 358/133
4,124,870 11/1978 Schatz et al. ......................... 358/260

Primary Examiner—Joseph A. Orsino, Jr.
Attorney, Agent, or Firm—Oblon, Fisher, Spivak, McClelland & Maier

[57] ABSTRACT

In a picture restoring method, an original picture is read with low density into picture elements arranged in the form of a grid, and the density data of the picture elements is subjected to decimal quantization to provide the density level of the picture elements. According to the decimal quantization density levels, the density levels of eight sets of picture elements, with three adjacent picture elements among picture elements around an aimed picture element as one set. The aimed picture element is divided into nine minute picture elements in the form of a grid. The density levels of the eight sets of picture elements are used to determine whether the minute picture elements are white or black. When more than four black minutes picture elements are around a minute picture element which has been decided white, the latter is converted into a black minute picture element.

1 Claim, 6 Drawing Figures

FIG. 1

| S(i-1,j-1) | S(i,j-1) | S(i+1,j-1) |
| --- | --- | --- |
| S(i-1,j) | S(i,j) | S(i+1,j) |
| S(i-1,j+1) | S(i,j+1) | S(i+1,j+1) |

FIG. 2

| $R_1$ | $R_2$ | $R_3$ |
| --- | --- | --- |
| $R_4$ | $R_5$ | $R_6$ |
| $R_7$ | $R_8$ | $R_9$ |

FIG. 3

| 0 | 3 | 6 | 6 | 4 | 1 | 0 | 0 |
| --- | --- | --- | --- | --- | --- | --- | --- |
| 0 | 0 | 4 | 9 | 9 | 8 | 2 | 0 |
| 0 | 0 | 0 | 6 | 9 | 9 | 6 | 0 |
| 0 | 0 | 0 | 4 | 9 | 9 | 5 | 0 |
| 0 | 0 | 0 | 7 | 9 | 9 | 1 | 0 |
| 0 | 0 | 3 | 6 | 5 | 1 | 0 | 0 |
| 0 | 0 | 0 | 0 | 0 | 0 | 0 | 0 |

METHOD OF RESTORING PICTURES WITH HIGH DENSITY

BACKGROUND OF THE INVENTION

This invention relates to a method of restoring an original picture with high density through estimation in the field of facsimile or in a copying machine.

A method is known in the art in which, where a picture to be sampled (or an original picture) is divided into square picture elements in the form of a grid, which are all sampled to restore through estimation curves or the like indicated white and black, if the aimed picture element is white (or black), white (or black) minute picture elements obtained by dividing the aimed picture element into four equal parts is changed into black (or white) minute picture elements (cf. Japanese Patent Laid-Open No. 41115/1978).

In the conventional picture restoring method, the original picture sampled with low density is restored with high density, thereby to reproduce especially the curves with high fidelity. However, even if the sampling is effected with 4 picture elements/mm × 4 picture elements/mm and the restoration is performed with 8 picture elements/mm × 8 picture elements/mm, i.e. the restoration is effected with 2-fold density according to the conventional method, the picture element density is still insufficient. That is, the conventional method cannot sufficiently reproduce the curves, and the restored picture is still insufficient in resolution.

SUMMARY OF THE INVENTION

Accordingly, an object of this invention is to provide a picture restoring method in which a picture sampled with low density is reproduced as a picture high in density and quality through estimation.

The foregoing objects and other objects of the invention have been achieved by the provision of a picture restoring method in which an original picture is read with low density into square picture elements arranged in the form of a grid, and the original picture is restored with high density by estimating the original picture with the density data of the picture elements, which according to the invention comprises the steps of: (a) subjecting the density data of the picture elements thus read to decimal quantization, to provide the density levels of the picture elements; (b) obtaining the density levels of eight sets of picture elements according to the decimal quantization density levels, with three adjacent picture elements among picture elements positioned around and aimed picture element as one set; dividing the aimed picture element into nine square minute picture elements arranged in the form of a grid, to determine whether the minute picture elements are white or black according to the density levels of eight sets of picture elements adjacent to the minutes picture elements, which have been obtained in the step (b); and (d) converting, when there are more than four black minute picture elements around a minute picture element which has been decided white in the step (c), the white minute picture element into a black minute picture element.

The nature, principle and utility of the invention will become more apparent from the following detailed description when read in conjunction with the accompanying drawings.

BRIEF DESCRIPTION OF THE DRAWINGS

In the accompanying drawings:

FIG. 1 is an explanatory diagram showing part of picture elements which are obtained by the reading operation of a reader;

FIG. 2 is also an explanatory diagram showing minute picture elements which are provided by dividing an aimed picture elements into equal square parts arranged in the formed of a grid;

FIG. 3 is an explanatory diagram showing the density levels of the picture elements which are quantized;

DETAILED DESCRIPTION OF THE INVENTION

Figure 4:
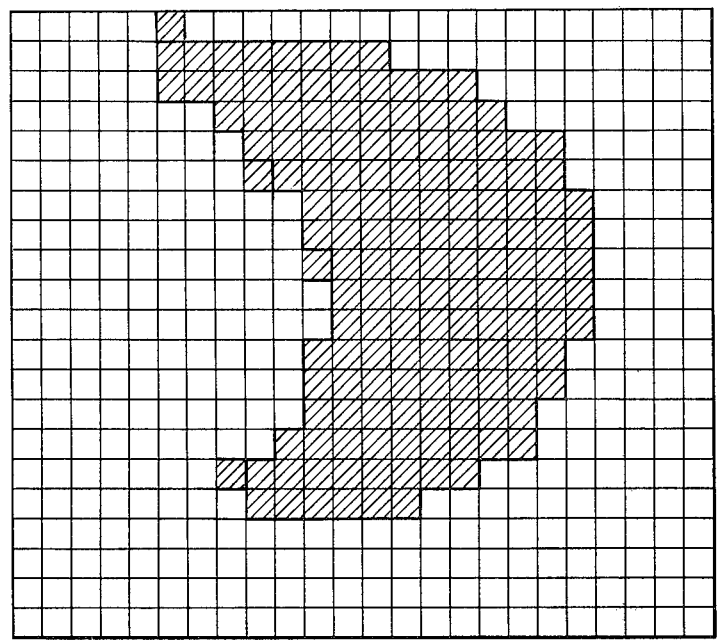
FIG. 4 is an explanatory diagram showing a picture which is reproduced according to a picture restoring method of this invention.

An original picture is read in scanning manner by a reader (not shown) into square picture elements arranged in the form of a grid, and the density data of the picture elements are outputted in synchronization with the scanning operation of the reader.

FIG. 1 shows part of the picture elements read by the reader. In FIG. 1, reference character S(i,j) designates an aimed picture element which is to be estimated and restored at a time instant $t_n$. The suffixes i and j (i, j=0, 1, 2, ... and n) indicate the address of a picture element. That is, the suffix i represents data on the horizontal axis, while the suffix j represents data on the vertical axis, and combinations of the suffixes i and j indicate the addresses of picture elements.

As was described above, the picture element S(i,j) is to be processed at the time instant $t_n$. For instance, after the picture element S(i,j) has been processed at the time instant $t_n$, the following picture element S(i+1, j) becomes the aimed picture element at the time instant $t_{n+1}$. In other words, all of the picture elements become the aimed picture element. The aimed picture element is not selectively defined, unlike the case where the picture elements are sampled at certain intervals.

The picture element thus read are processed according to the following steps into a picture high in density:

(a) The density data of the picture elements read by the reader are subjected to decimal quantization, i.e. the density levels of the picture elements are classified into ten (10) grades (k=0, 1, 2, ... and 9). The density level of a picture element thus quantized will be designated by "SQ". With SQ=0, the picture element is white. With SQ=9, the picture element is black. With SQ=2 to 8, the picture element is between white and black.

(b) Among eight picture elements around the aimed picture element S(i,j), three picture elements adjacent to one another are selected as one set, so that eight sets of picture elements are provided (FIG. 1). The density levels T1 through T4 and T6 through T9 of the eight sets of picture elements are obtained according to the quantization density levels SQ which are obtained according to the step (a) above. Thus, the density levels T1-T9 are:

$$\left.\begin{array}{l}T1 = SQ(i-1,j) + SQ(i-1,j-1) + SQ(i,j-1)\\ T2 = SQ(i-1,j-1) + SQ(i,j-1) + SQ(i+1,j-1)\\ T3 = SQ(i,j-1) + SQ(i+1,j-1) + SQ(i+1,j)\\ T4 = SQ(i-1,j-1) + SQ(i-1,j) + SQ(i-1,j+1)\\ \\ T6 = SQ(i+1,j-1) + SQ(i+1,j) + SQ(i+1,j+1)\\ T7 = SQ(i-1,j) + SQ(i-1,j+1) + SQ(i,j+1)\\ T8 = SQ(i-1,j+1) + SQ(i,j+1) + SQ(i+1,j+1)\\ T9 = SQ(i+1,j) + SQ(i+1,j+1) + SQ(i,j+1)\end{array}\right\} \quad (1)$$

In other words, the equation (1) represents the sums of the quantization density levels of eight sets of three-picture-elements which are positioned above (T2), below (T8), left (T4), right (T6), left above (T1), right above (T3), left below (T7) and right below (T9) the aimed picture element S(i,j).

(c) The aimed picture element S(i,j) is divided into nine equal square minute picture elements R1 through R9 (FIG. 2). It is determined according to the density levels T1 through T4 and T6 through T9 which have been obtained in the above-described step (b) whether each of the minute picture elements R1 through R9 is white or black.

This will be described in more detail. It is assumed that the quantization value of the aimed picture element SQ(i,j) obtained in the above-described step (a) is k(=0, 1, 2, . . . , 9).

(i) In the case of K<5:

A minute picture element $R_{max1}$ (one of the minute picture elements R1 through R9) corresponding to the maximum value $T_{max1}$ among the peripheral picture element density levels T1 through T4 and T6 through T9 is determined black. Then, a minute picture element $R_{max2}$ corresponding to the next maximum value $T_{max2}$ among the minute picture elements except the minute picture element $R_{max1}$ is determined black. The determination is successively carried out k times, so that minute picture elements corresponding to maximum values $T_{maxn}$ are determined black, and the remaining minute picture elements are determined white. When two or more peripheral picture element density levels T1 through T4 and T6 through T9 have equal density levels, the minute picture elements R1 through R9 are assigned by selecting the maximum values $T_{MAXN}$ in increasing values of N.

For instance, when $T_{max1}=T4$ with k=3, R4 is determined black. Next, when $T_{max2}=T1$, R1 is determined black. Then, when $T_{max3}=T7$, R7 is black. The remaining minute picture elements are white.

(ii) In the case of k≧5:

In contrast to the case (i) above, a minute picture element $R_{min1}$ (one of the minute picture elements R1 through R9) corresponding to the minimum value $T_{min1}$ among the peripheral picture element density levels T1 through T4 and T6 through T9 is determined white. A minute picture element $R_{min2}$ corresponding to the next minimum value $T_{min2}$ among the minute picture elements except the minute picture element $R_{min1}$ is determined white. The determination is successively carried out 9-k times, so that minute picture elements corresponding to minimum values $T_{minn}$ are determined white, and the remaining minute picture elements are determined black. When two or more peripheral picture element density levels T1 through T4 and T6 through T9 have equal density levels, the minute picture elements R1 through R9 are assigned by selecting the minimum values $T_{MINN}$ in increasing values of N.

(iii) In the case of k=0:

All of the minute picture elements R1 through R9 are determined white.

(iv) In the case of k=9:

All of the minute picture elements R1 through R9 are determined black.

(d) When, in the minute picture elements R1 through R9, there are more than four black minute picture elements around the minute picture element which has been determined white in step (c), the white minute picture element is redetermined black.

A picture high in density can be obtained by performing the steps (a) through (d) up to the picture element $S(i_{max},j_{max})$ of the original picture.

Figure 5:
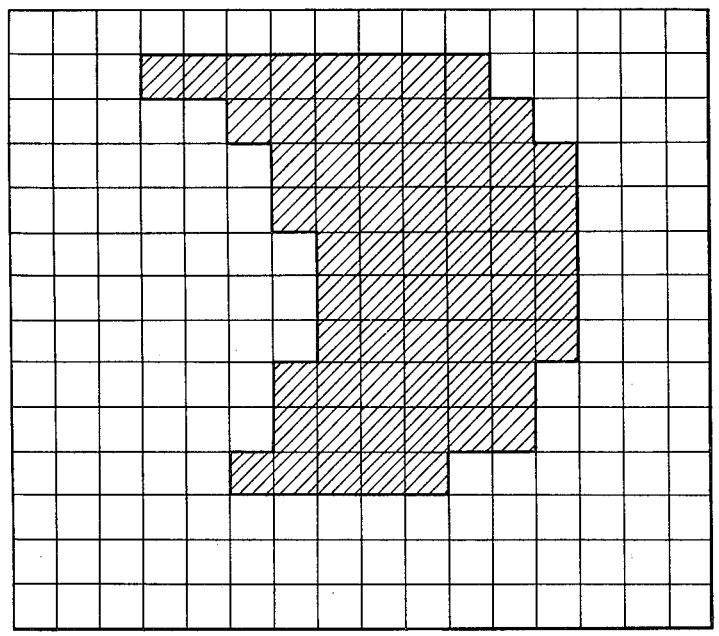
FIG. 5 is an explanatory diagram, corresponding to FIG. 4, showing a picture which is reproduced according to a conventional picture restoring method.

Picture restoration according to the invention will be described with reference to FIGS. 3, 4 and 5.

FIG. 3 shows the density levels which are obtained by subjecting to quantization in decimal notation according to step (a) the density data of picture elements which are provided by reading an original picture Io with the reader. In this example, it is assumed that a white background surrounds the original picture Io and thus has a density of zero. FIG. 4 shows a picture Ir which is restored through the processes according to steps (b) through (d), corresponding to the original picture. FIG. 5 shows a picture which is restored from the original picture according to the conventional method. As is clear from comparison between FIG. 4 (the present invention) and FIG. 5, the restored picture according to the invention is superior in resolution and especially in the reproducibility of curves to one according to the conventional method.

Figure 6:
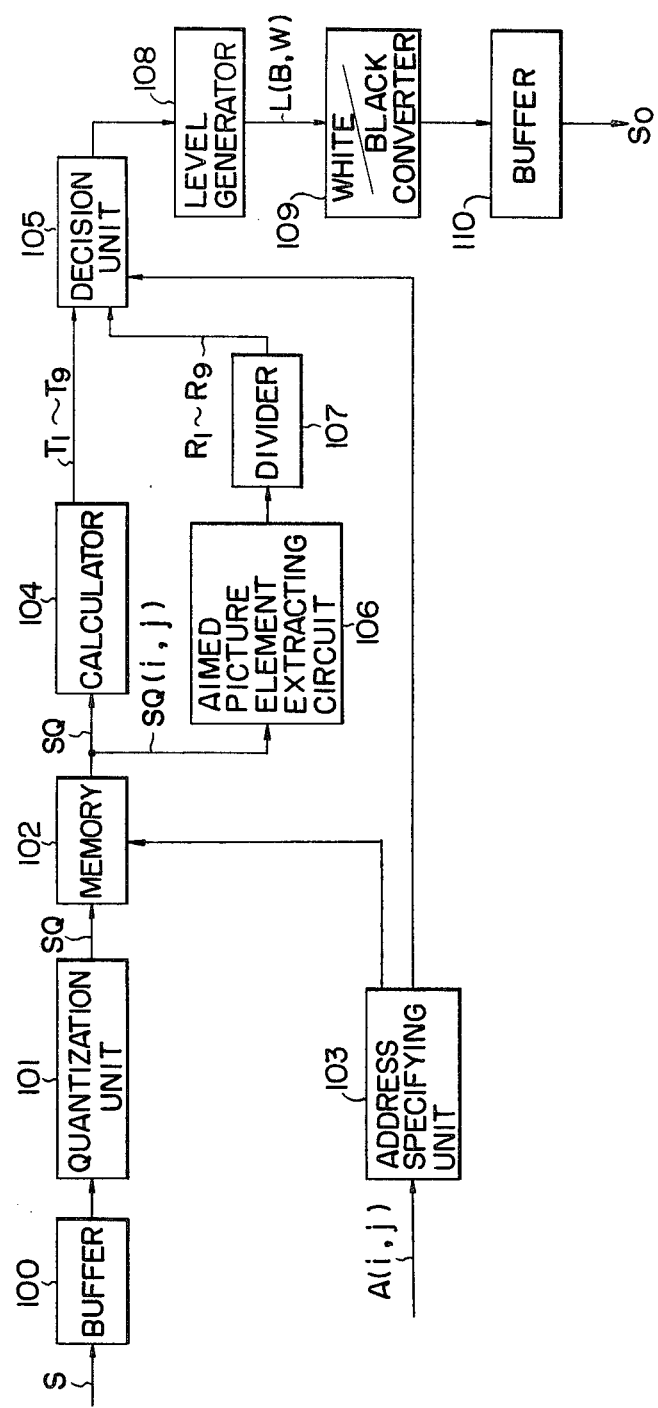
FIG. 6 is a block diagram showing an apparatus for practicing the picture restoring method according to the invention.

An apparatus for practicing the method of the invention will be described with reference to FIG. 6. An input picture element signal S bearing the density data of a picture element read is applied through an input buffer 100 to a quantization unit 101, where it is subjected to decimal quantization, to provide a picture data signal SQ. This signal SQ is stored in a memory 102. In this case, the signal SQ is stored in an address which is specified by an address specifying unit 103 with the aid of an address signal A(i,j). The address thus specified corresponds to the address of the picture element S which has been read.

The quantized picture element data signal SQ thus stored is transferred to a calculator 104, in which the calculations according to the equation (1) in step (b) are carried out; that is, the density levels T1-T9 of the picture elements around the aimed picture element S(i,j) are calculated. The peripheral picture element density level signals T1-T9 are applied to a decision unit 105.

In the decision unit 105, it is decided whether the minute picture element signals R1 through R9 which are provided through an aimed picture element extracting circuit 106 and a divider 107 are white or black, according to the decision conditions in paragraphs (i) through (iv) in step (c).

As a result of the decision, the outputs R1-R9 are applied to a level generator 108. The level generator 108 outputs a signal L(B/W) including a black level signal (e.g. a logic level signal "1") and a white level signal (e.g. a logic level signal "0") corresponding to the white/black decision of the outputs R1-R9. The signal L(B/W) is applied to a white/black converter 109.

In the white/black converter 109, it is detected whether more than four black minute picture elements are around the minute picture element which has been decided white or not, and if there are more than four black minute picture elements, then the white minute picture element is changed black. If the number of black minute picture elements is less than five, then the signal L(B/W) is outputted, as it is, by the white/black converter 109. The output of the converter 109 is applied, as an output picture element signal $S_0$, through an output buffer 110 to a printing device (not shown), whereby a picture high in density is obtained.

As is apparent from the above description, according to the invention, even if a picture is read with low density, it can be restored into a picture high in density. This is effective in reproducing a picture having curves or curved portions. Thus, a picture restored according to the invention is considerably high in quality.

What is claimed is:

1. A picture restoring method in which an original picture is read with low density into square picture elements arranged in the form of a grid, and the original picture is restored with high density by estimating the original picture with the density data of said picture elements, comprising the steps of:

(a) subjecting the density data of said picture elements thus read to decimal quantization, to provide the density levels of said picture elements;

(b) obtaining the density levels of eight sets of picture elements according to said decimal quantization density levels, with three adjacent picture elements among picture elements positioned around an aimed picture element making up one set;

(c) dividing said aimed picture element into nine square minute picture elements arranged in the form of a grid, to determine whether each of said minute picture elements are white or black according to the density levels of each of eight sets of picture elements adjacent to said minute picture elements, which have been obtained in said step (b); and (d) converting, when there are more than four black minute picture elements around a minute picture element which has been decided white in said step (c), said white minute picture element into a black minute picture element.

* * * * *